(12) United States Patent
Amundsen

(10) Patent No.: US 11,010,933 B2
(45) Date of Patent: May 18, 2021

(54) METHOD AND SYSTEM FOR PRESENTATION OF RISKS

(71) Applicant: INBARIO AS, Vikhammer (NO)

(72) Inventor: Harald Amundsen, Vikhammer (NO)

(73) Assignee: Inbario AS, Vikhammer (NO)

( * ) Notice: Subject to any disclaimer, the term of this patent is extended or adjusted under 35 U.S.C. 154(b) by 0 days.

(21) Appl. No.: 16/320,008

(22) PCT Filed: Jul. 5, 2017

(86) PCT No.: PCT/NO2017/050178
§ 371 (c)(1),
(2) Date: Jan. 23, 2019

(87) PCT Pub. No.: WO2018/026286
PCT Pub. Date: Feb. 8, 2018

(65) Prior Publication Data
US 2019/0266759 A1    Aug. 29, 2019

Related U.S. Application Data

(60) Provisional application No. 62/370,738, filed on Aug. 4, 2016.

(51) Int. Cl.
*G06T 11/00*    (2006.01)
*G06Q 10/06*    (2012.01)
(Continued)

(52) U.S. Cl.
CPC ............ *G06T 11/001* (2013.01); *G06F 3/048* (2013.01); *G06F 3/0481* (2013.01);
(Continued)

(58) Field of Classification Search
CPC ........ G06F 16/00; G06F 3/048; G06F 3/0481; G06F 3/04817; G06F 3/04847;
(Continued)

(56) References Cited

U.S. PATENT DOCUMENTS 6,219,053 B1    4/2001    Tachibana et al.
7,603,367 B1    10/2009   Kanter et al.
(Continued)

FOREIGN PATENT DOCUMENTS

JP        2017084312 A      5/2017

OTHER PUBLICATIONS

International Search Report and Written Opinion dated Oct. 19, 2017 for International Patent Application No. PCT/NO2017/050178.

*Primary Examiner* — Ming Wu
(74) *Attorney, Agent, or Firm* — Alix, Yale & Ristas, LLP

(57) ABSTRACT

A method and system for presentation of risks comprising using standardized two colored risk rating symbols in a graphical user interface of a client representing risks, wherein main colors representing risk level/rating is used as fill colors of the standardized two colored risk rating symbols. The method and system is further be arranged for detecting if a risk is close to another risk level/rating and displaying the standardized two colored risk rating symbol of a risk with a borderline color in another color than the main color, and if there is no close other risk level/rating displaying the standardized two colored risk rating symbol of a risk with a borderline color in the same color as main fill color or without borderline color.

18 Claims, 18 Drawing Sheets

(51) Int. Cl.
- *G06T 11/20* (2006.01)
- *G06F 3/0481* (2013.01)
- *G06F 3/048* (2013.01)
- *G06F 3/0484* (2013.01)
- *G06F 16/00* (2019.01)
- *G06Q 10/10* (2012.01)

(52) U.S. Cl.
CPC ...... *G06F 3/04817* (2013.01); *G06F 3/04847* (2013.01); *G06F 16/00* (2019.01); *G06Q 10/067* (2013.01); *G06Q 10/0635* (2013.01); *G06Q 10/10* (2013.01); *G06T 11/00* (2013.01); *G06T 11/206* (2013.01); *G06T 2200/24* (2013.01)

(58) Field of Classification Search
CPC .. G06Q 10/0635; G06Q 10/067; G06Q 10/10; G06T 11/00; G06T 11/001; G06T 11/206; G06T 2200/24
See application file for complete search history.

(56) References Cited

U.S. PATENT DOCUMENTS

| | | | |
|---|---|---|---|
| 8,214,235 | B2 | 7/2012 | Tait et al. |
| 8,423,445 | B2* | 4/2013 | Rotenberg ............. G06Q 40/12 705/35 |
| 2005/0060647 | A1 | 3/2005 | Doan et al. |
| 2006/0274070 | A1* | 12/2006 | Herman ................ G06F 3/0481 345/474 |
| 2010/0275263 | A1 | 10/2010 | Bennett et al. |
| 2011/0219324 | A1 | 9/2011 | Watanabe et al. |
| 2011/0302514 | A1* | 12/2011 | Rinaudo ................... G06F 8/38 715/763 |
| 2014/0200953 | A1 | 7/2014 | Mun |
| 2014/0278733 | A1* | 9/2014 | Sabharwal ......... G06Q 10/0635 705/7.28 |
| 2014/0375667 | A1 | 12/2014 | Reville et al. |
| 2015/0039657 | A1* | 2/2015 | Roth .................... G06F 3/0484 707/805 |

* cited by examiner

| Probability | High | YELLOW circle YELLOW border | RED circle YELLOW border | RED circle RED border |
|---|---|---|---|---|
| | Medium | GREEN circle YELLOW border | YELLOW circle YELLOW border | RED circle YELLOW border |
| | Low | GREEN circle GREEN border | GREEN Circle YELLOW border | YELLOW circle YELLOW border |
| | | Low | Medium | High |
| | Impact | | | |

METHOD AND SYSTEM FOR PRESENTATION OF RISKS

BACKGROUND

The disclosure is related to a method and system for presentation of risks.

Risk exists in every business activity, and risk management has become an integral part of modern business management.

Risk is the potential of gaining or losing something of value and can be categorized as a threat or an opportunity.

Risk with potential negative impact is categorized as a threat, which can prevent value creation or erode existing value.

Risk with potential positive outcome is categorized as an opportunity, which can positively affect the achievement of objectives, supporting value creation or preservation.

The amount of risk is usually categorized into a small number of levels organized into risk matrices as neither the probability nor severity can typically be estimated with accuracy and precision. Risk matrices—also known as risk assessment matrices—are matrices that are used during risk assessment to define the various levels of risk as the product of the harm probability categories and harm severity categories.

Enterprise risk management (ERM) systems typically use the terms 'risks' if the potential outcome is a threat and opportunity if the potential outcome is positive.

U.S. Pat. No. 8,214,235 B2 teaches a method of enterprise risk management including defining a hierarchical organizational model to represent an enterprise where each subordinate level including one or more entities has a reporting relationship to one of the entities in the preceding level.

U.S. Pat. No. 7,603,367 B1 describes a computer-implemented method for displaying information related to items categorized into a plurality of nodes logically arranged into a hierarchy.

US 20050060647 A1 describes an invention that relates to automated presentation of data and, in particular, to the automatic selection of suitable presentation methods for hierarchical data.

US 20140375667 A1 describes a computer-implemented method of generating a visualization of a plurality of catastrophic risk metrics associated in an image having a plurality of portions, each corresponding to one of the catastrophic risk metrics associated with the risk agent.

US 20110219324 A1 describes a graphical hierarchical data wheel for displaying hierarchical nodes where the wheel further includes one or more concentric rings comprising a plurality of segments.

U.S. Pat. No. 6,219,053 B1 describes an icon display and method which reflect the perspective of correlation between icons which have hierarchical relationships.

U.S. Pat. No. 8,423,445 B2 relates to method and system for three-dimensional presentation of financial data using geometric figures and connections in different colors.

A drawback of the mentioned prior art is that they are not able to provide a solution which can be adapted to the end user, and especially by that they do not provide a solution where a hierarchy can be split into several independent hierarchies based on filters set by the end user.

A further drawback of prior art is that they are not able to visualize risk and its risk rating in a simple manner, and especially by that they do not provide standardized two colored risk rating symbols generated from risk matrices to enable presentation of risks in a graphical user interface for enterprise-wide risk management.

SUMMARY

The disclosure provides a method and system for presentation of risks partly or entirely solving the drawbacks of prior art.

The disclosed embodiments provide a method and system arranged for presentation of risks by the use of standardized two colored risk rating symbols in a graphical user interface for enterprise-wide risk management.

The disclosed embodiments provide a method and system arranged for organizing risks into one or more protection layer hierarchies and visualizing protection layers in structural line relationship diagrams typically resembling the structure of the organization and the relationships relative ranks of its parts and positions.

The disclosed embodiments provide a method and system arranged for using two colored risk rating symbols to represent risks using main colors defined during configuration as fill colors and as borderline colors, and for risk matrices.

The disclosed embodiments provide a method and system arranged for using borderline colors if sub categories are enabled during configuration of the system.

The disclosed embodiments provide a method and system arranged for automatically assigning standardized two colored risk rating symbols to each of various risk matrix cells in use.

The disclosed embodiments provide a method and system arranged for enabling a user, during risk assessment, to select a risk matrix cell that represents the risk level, i.e. risk rating, and the standardized two colored risk rating symbol assigned to the selected risk matrix cell is then used to visualize the risk and its risk rating in the system.

The disclosed embodiments provide a method and system arranged to filter protection layer hierarchies dynamically, and wherein the protection layer hierarchies of the presentation changes according to the filter(s) set.

The disclosed embodiments provide a method and system arranged to use layer maps to present risks that are location specific and/or if it is important to have an overview over risks in different areas/locations.

The disclosed embodiments provide a method and system arranged to link layer maps to protection layers and filtering the layer maps dynamically, and wherein the layer maps changes according to the filter(s) set.

Further, the disclosed embodiments will appear from the following description, claims and attached drawings.

The disclosed embodiments introduce a method and system (navigation and display system) for presentation of risks by the use of standardized two colored risk rating symbols—e.g. circles—in a graphical user interface for enterprise-wide risk management.

The standardized two colored risk rating symbols are used to represent risks use main colors defined during configuration as fill colors and as borderline colors. The borderline colors are used if sub categories are enabled during configuration of the system. The main colors defined in the system are also used in the risk matrices.

According to the disclosure, risks with borderline color in another color than the main risk color, i.e. the fill color, are used to display risks that are close to another risk rating. For instance, a risk rated with a green colored risk rating symbol with yellow borderline is a risk that is close to being rated as yellow. If there is no close other risk level/rating the standardized two colored risk rating symbol of a risk is displayed with a borderline color in the same color as main fill color or without borderline color.

The disclosed embodiments can further comprise displaying the standardized two color risk symbol with additional contrast border line between fill color and borderline color and/or at outer circumference of the standardized two colored risk symbol for enhanced visibility. In addition any other technique for creating contrast between the fill color and the borderline color can be used, such as using 3D symbols or animated symbols.

The same principle is also used for protection layers. Protection layers are logical collections of risks, and all risks are assigned to at least one protection layer.

The method and system are arranged to automatically assign one of the colored risk rating symbols to each of the various risk matrices cells in use by the system. During risk assessment the user selects a risk matrix cell that represents the risk level, i.e. risk rating, and the colored risk rating symbol assigned to the selected risk matrix cell is then used to visualize the risk and its risk rating in the system.

According to a further embodiment, the risk matrices are organized into one or more protection layer hierarchies.

These protection layer hierarchies are visualized as structural line relationship diagrams typically resembling the structure of the organization and the relationships relative ranks of its parts and positions. These diagrams look like organizational charts, but can also include some special connection lines used for inheriting protection layer ratings and to control user access.

The method and system are arranged to filter protection layer hierarchies dynamically. When filtering the protection layer hierarchies the presentation changes according to the filter(s) set.

Protection layers that are configured for evaluation requires a responsible person to evaluate the protection layer rating within a deadline, for instance every 8th week. When evaluating a protection layer all risks associated with the protection layer are evaluated together with the rating of the protection layers inherited and a resulting protection layer rating is set. The protection layer rating is then indicated by a standardized two colored risk rating symbol. Evaluation of protection layers is not mandatory, and evaluation can be enabled or disabled individually during configuration.

If evaluation of the protection layer is not enabled the protection layer will be set dynamically by configured inheriting rules.

The method and system are further arranged for automatically assigning a standardized two colored risk rating symbol to the cells in the risk matrices in use by the system.

For simplification purposes, the term risk for both threats and opportunities. Risks are further categorized as a threat or an opportunity.

The method and system also includes the use of layer maps to present risks that are location specific and/or if it is important to have an overview over risks in different areas/locations.

According to a further embodiment, it is arranged to link layer maps to protection layers and filtering the layer maps dynamically, and wherein the layer maps changes according to the filter(s) set.

BRIEF DESCRIPTION OF THE DRAWINGS

Aspects of the disclosed embodiments will be described below in detail with references to the attached drawings, wherein like numerals reflect like elements:

FIG. 6 shows an example for how risk matrix cells in FIG. 4 are mapped to the two colored risk rating symbol representing the different risk ratings in the system, FIG. 7 shows a screenshot illustrating an exemplary risk that has been mapped to a cell in a risk matrix and assigned a two colored risk rating symbol.

DETAILED DESCRIPTION

Different levels of gray color are used as substitute designations for green, yellow and red colors in the black and white Drawings.

Figure 1:
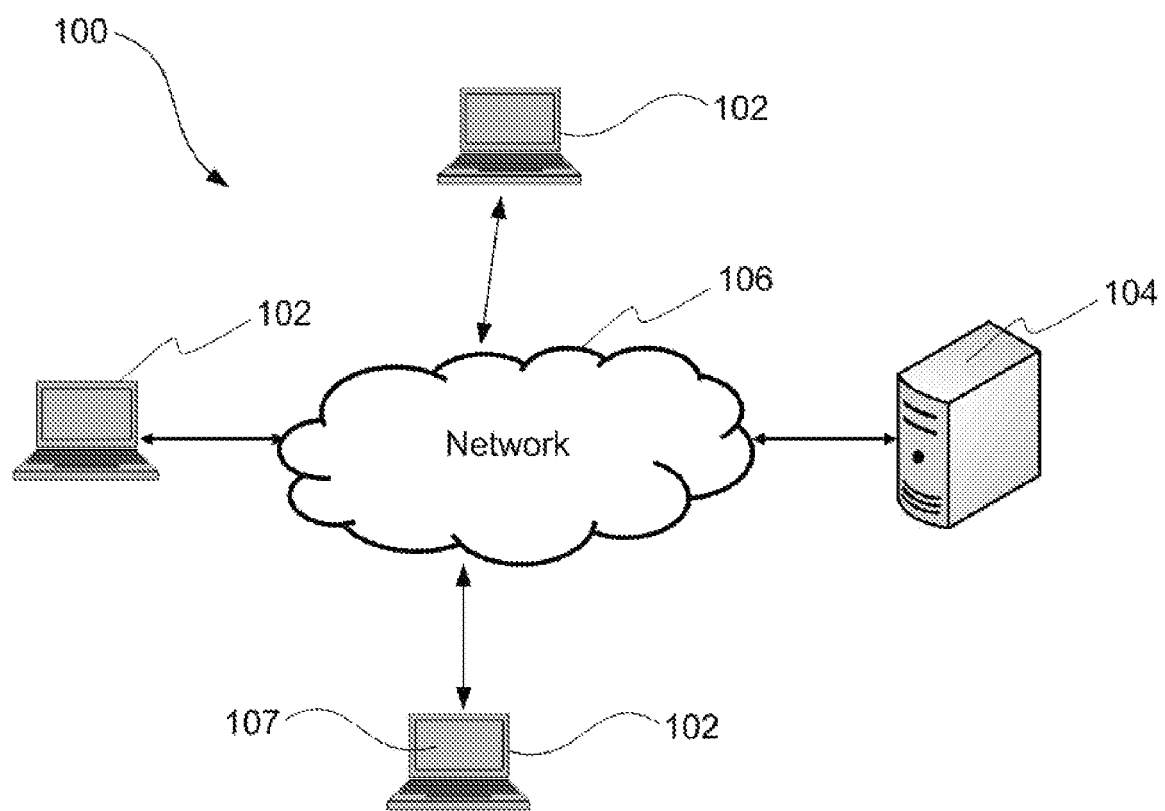
FIG. 1 is a principle drawing of a typical risk management system.

FIG. 1 illustrates an exemplary risk management system 100. A risk management system 100 may include a one or several clients 102 used by the users of the system. Clients 102 may be, for example, personal computers, network computers, tablets, Smart Phones, or the like, in which aspects of the illustrative embodiments may be implemented. The risk management system 100 contains at least one network 106, which is the medium used to provide communication links between various clients 102 connected together within risk management system 100. The network 106 may include connections, such as wire, wireless communication links, or fiber optic cables. The risk management system 100 may include additional servers 104, clients 102, and other devices not shown, such as one or several internal or external databases. The client(s) 102 will be provided with a graphical user interface 107, communication device adapted the network 106, and a processor for processing information. The processor will further be provided with means and/or software for performing the features/steps as will be discussed in FIG. 2-19.

Figure 2:
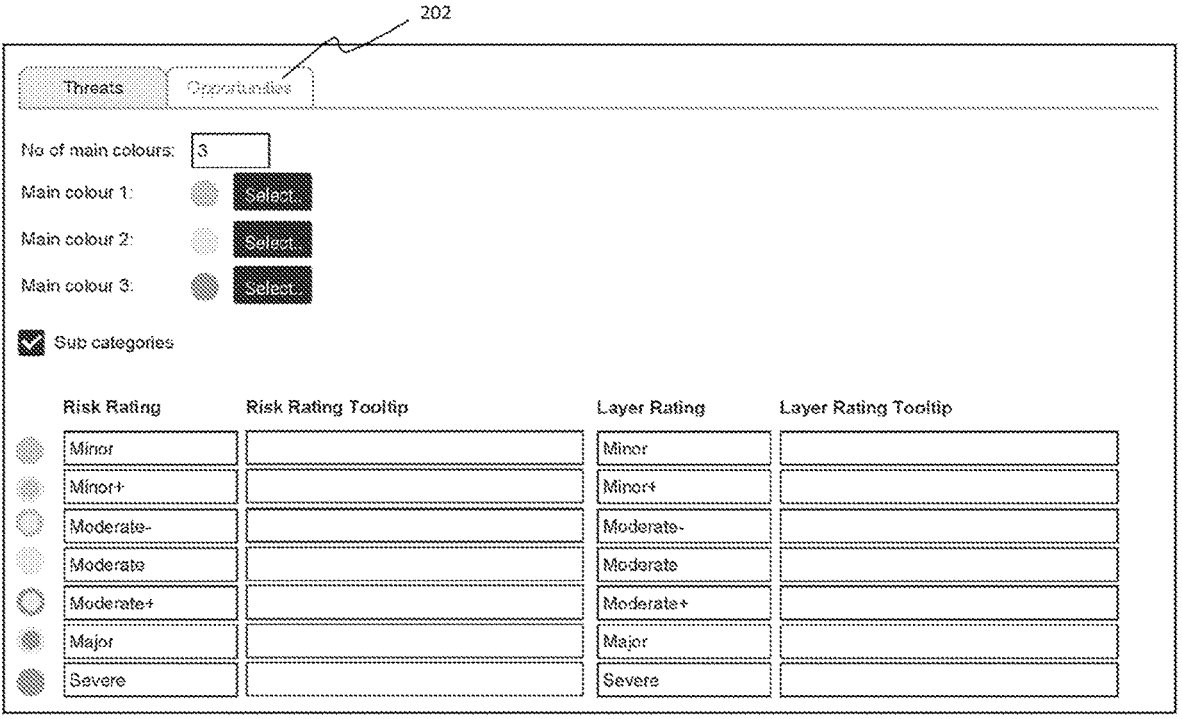
FIG. 2 shows a screenshot illustrating configuration of the standardized colors used in two colored risk rating symbols representing risk and protection layers used in the system.

Reference is now made to FIG. 2 which illustrates the principles used by a user with administration privileges to configure the colors used in two colored risk rating symbols representing the different risk and protection layers.

First the user sets the number of main colors to be used for threats and selects the colors to be used in the two colored risk rating symbols representing the risk (i.e. risk rating) and protection layers (i.e. layer rating). If threats are not used the number of main colors is set to 0.

'Sub categories' is only enabled (selectable) if the number of main colors is greater than 1.

Lines for sub categories are automatically inserted into the table if use of sub categories is selected, i.e. into the table where the Risk Rating and Layer Rating are to be described by the user.

The two colored risk rating symbols representing the risk (i.e. risk rating) and protection layers (i.e. layer rating) are populated in the table as shown in FIG. 2. The two colored risk rating symbol shape can be any shape, but in the example implementation circles are used for illustration purposes.

Figure 3:
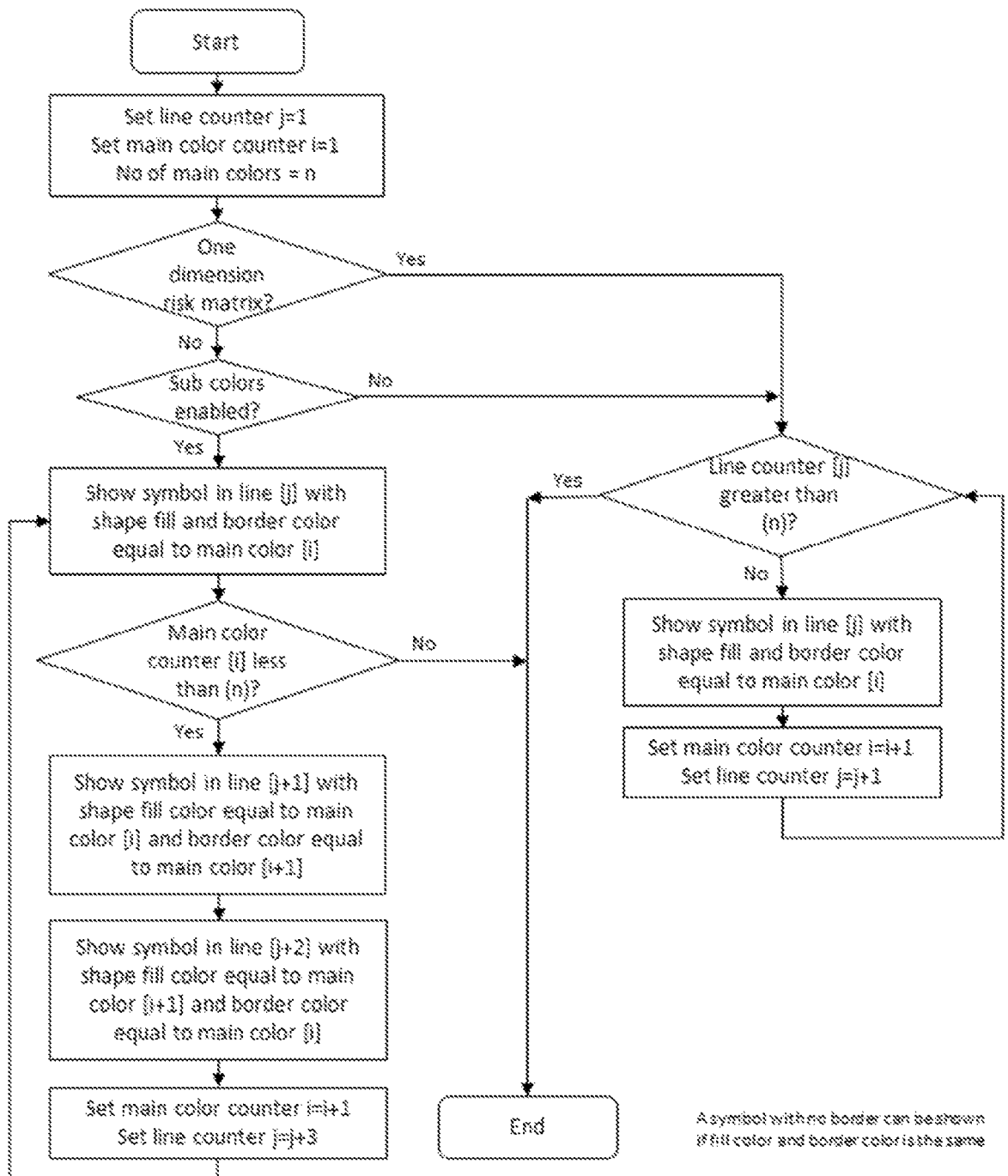
FIG. 3 shows a flow diagram for assigning icon fill and borderline colors to two colored risk rating symbols representing risk and protection layers.

With reference to FIG. 3 two colored risk rating symbols representing the risk (i.e. risk rating) and protection layers (i.e. layer rating) are added to the table in FIG. 2 as described in the example below:
　The two colored risk rating symbol used in this example is a circle, but any risk rating symbol or combination of risk rating symbols could have been used.
　The user selects GREEN as main color 1, YELLOW as main color 2, and RED as main color 3.
　The table in FIG. 2 is populated with 3 lines:
　　The two colored risk rating symbol in line 1 shows a GREEN circle with GREEN borderline. (This is the old line 1).
　　The two colored risk rating symbol in line 2 shows a YELLOW circle with YELLOW borderline,
　　The two colored risk rating symbol in line 3 shows a RED circle with RED borderline.
　Then the user selects 'Sub categories' and the table in FIG. 2 is populated as shown below:
　　The two colored risk rating symbol in line 1 shows a GREEN circle with GREEN borderline.
　　The two colored risk rating symbol in line 2 shows a GREEN circle with YELLOW borderline.
　　The two colored risk rating symbol in line 3 shows a YELLOW circle with GREEN borderline.
　　The two colored risk rating symbol in line 4 shows a YELLOW circle with YELLOW borderline. (This is the old line 2).
　　The two colored risk rating symbol in line 5 shows a YELLOW circle with RED borderline.
　　The two colored risk rating symbol in line 6 shows a RED circle with YELLOW borderline.
　　The two colored risk rating symbol in line 7 shows a RED circle with RED borderline. (This is the old line 3).

By clicking on the Opportunities tab 202 shown in FIG. 2 the user will be able to configure colors used in the two colored risk rating symbols representing risk and protection layer opportunities.

The configurations of opportunities are similar to the configuration of threats, but with other main colors than used for the threats. The number of main colors, use of sub categories and rating descriptions are set independently of the configured threats. If opportunities are not used the number of main colors for opportunities are set to 0.

Figure 4:
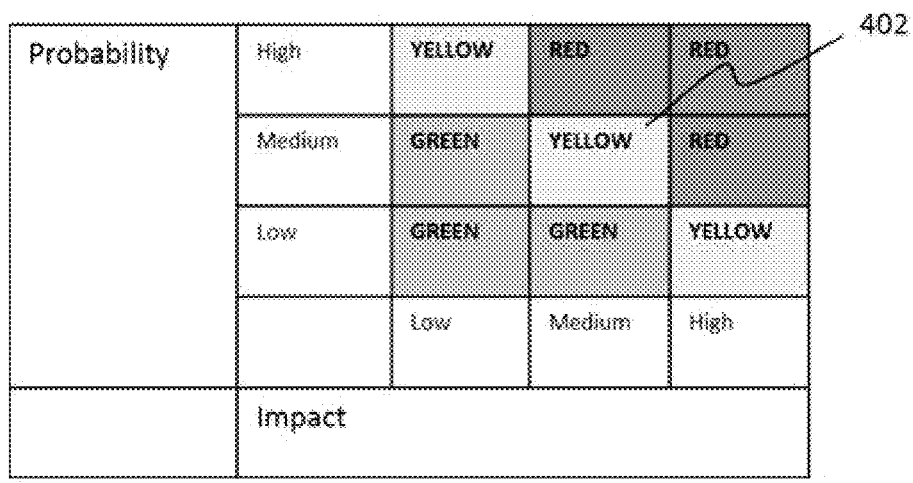
FIG. 4 shows a typical risk matrix.

FIG. 4 shows a typical risk matrix. The risk matrices used by the system can have different layouts, configuration and size, but the colors used in the matrix cells are the same as for threats and opportunities.

When the user of the system sets the risk rating, i.e. risk level, for a risk he/she selects a cell in a risk matrix and the risk is then assigned a two colored risk rating symbol that represents the risk.

Figure 5:
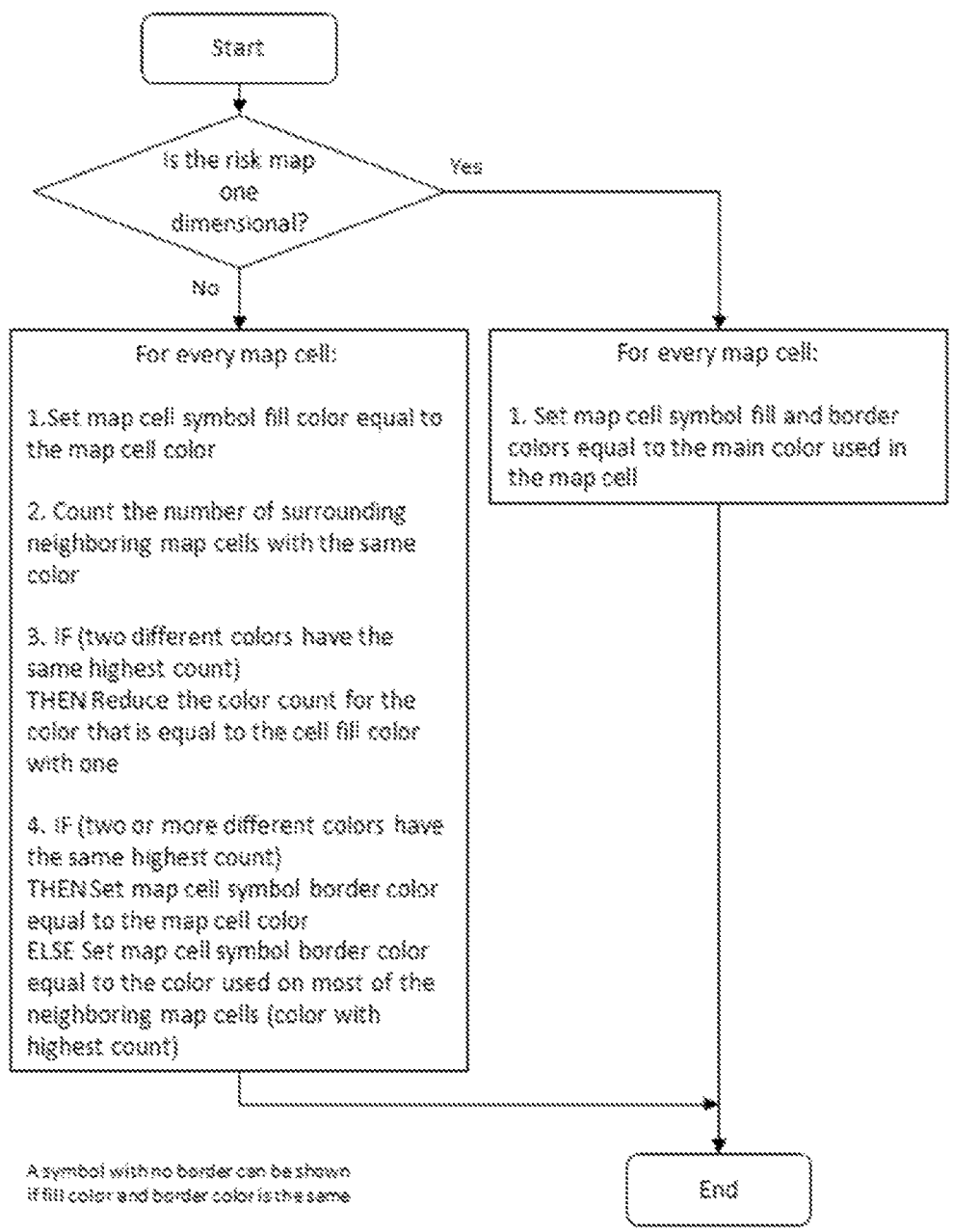
FIG. 5 shows a flow diagram for mapping risk matrix cells to the two colored risk rating symbols representing the different risk ratings in the system.

FIG. 5 shows a flow diagram for mapping risk matrix cells to the two colored risk rating symbols representing the different risk ratings in the system.

An example illustrating how risk matrix cells in FIG. 4 are mapped to the two colored risk rating symbol representing the different risk ratings in the system is shown in FIG. 6:
　The two colored risk rating symbol used in this example is a circle, but any risk rating symbol or combination of two colored risk rating symbols could have been used.
　The risk matrix is two dimensional.
　For example the YELLOW cell 402 with Probability and Impact equal to Medium has 3 GREEN neighbor cells, 3 RED neighbor cells and 2 YELLOW neighbor cells, and the two colored risk rating symbol that represents the cell 402 is therefore an YELLOW circle with YELLOW borderline as indicated by 602 as the final count based on the mapping rules was 3 GREEN neighbor cells, 3 RED neighbor cells and 2 YELLOW neighbor cells.

The number of neighbor cells can be different from cell to cell in the risk matrix. In FIG. 4 for example, the cell 402 has a total of 8 neighbor cells, but the cells in the corner of the risk matrix has only 3 neighbor cells.

FIG. 7 illustrates an exemplary risk that is being mapped to a cell in a risk matrix 702 and assigned a two colored risk rating symbol 704 with colors matching the configured main and sub colors in use by the system. In this example the user activates a radio button to select a cell in the risk matrix to set the risk level, and the system shows the two colored risk rating symbol 704 associated with the selected risk matrix cell. As the risk matrix is one dimensional the risk rating symbol 704 will be single colored with fill and borderline color equal to the color of the selected risk matrix cell, i.e. GREEN color.

If the user uses more than several risk matrices during risk assessment the risk rating is set equal to the risk matrix cell with the highest risk level. For instance the risk rating is set to YELLOW if the risk rating is both Risk Category Operational with rating GREEN and Reputation with rating YELLOW.

Figure 8:
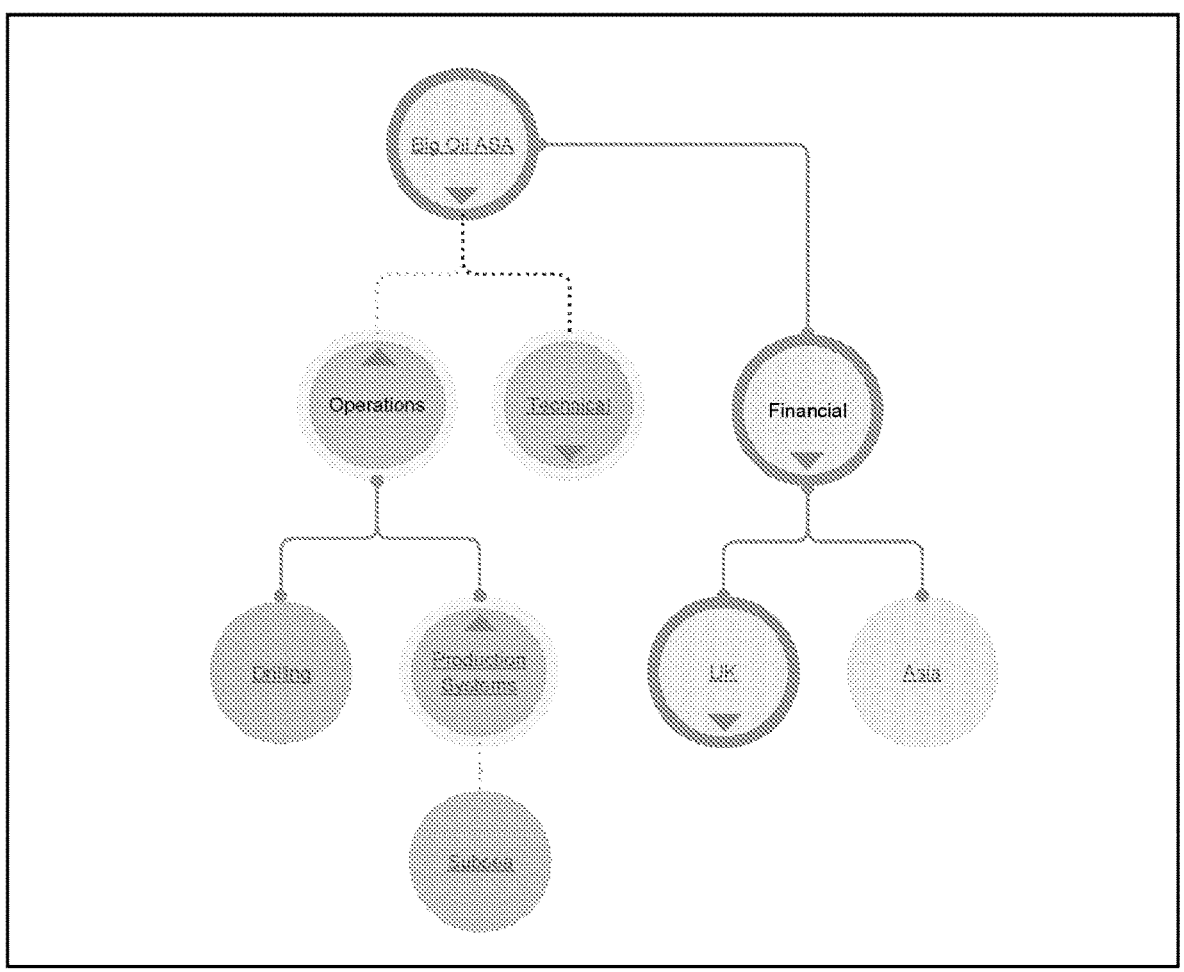
FIG. 8 shows a screenshot illustrating an exemplary protection layer hierarchy configured by a user with administration privileges, and used by the system.

FIG. 8 illustrates an exemplary protection layer hierarchy configured by a user with administration privileges, and used by the system.

The figure shows the configuration of a protection layer hierarchy used by an exemplary company called Big Oil ASA.

Solid lines are used to connect protection layers that inherit ratings from other protection layers, and dashed/ dotted type of lines are used to connect protection layers with that do not inherit ratings from each other.

The 'Big Oil ASA' protection layer inherits rating from the 'Financial' protection layer. As the 'Big Oil ASA' protection layer is evaluated its two colored risk rating symbol contains a hyperlink, i.e. in this example an underlined blue text. When the protection layer is evaluated the user responsible for the layer sets its rating, i.e. protection layer rating. The protection layer rating proposed by the system upon evaluation will be based on the risks associated with the protection layer and the inherited protection layers, but the protection layer rating can be set freely by the responsible user.

The 'Financial' protection layer inherits ratings from the 'UK' and the 'Asia' protection layers, but as it is not evaluated its two colored risk rating symbol does not contain a hyperlink. Protection layer rating can be inherited from the protection layer with the highest protection layer rating, in this example the protection layer 'UK', or based on some kind of predefined protection layer rating inheriting rules.

Figure 9:
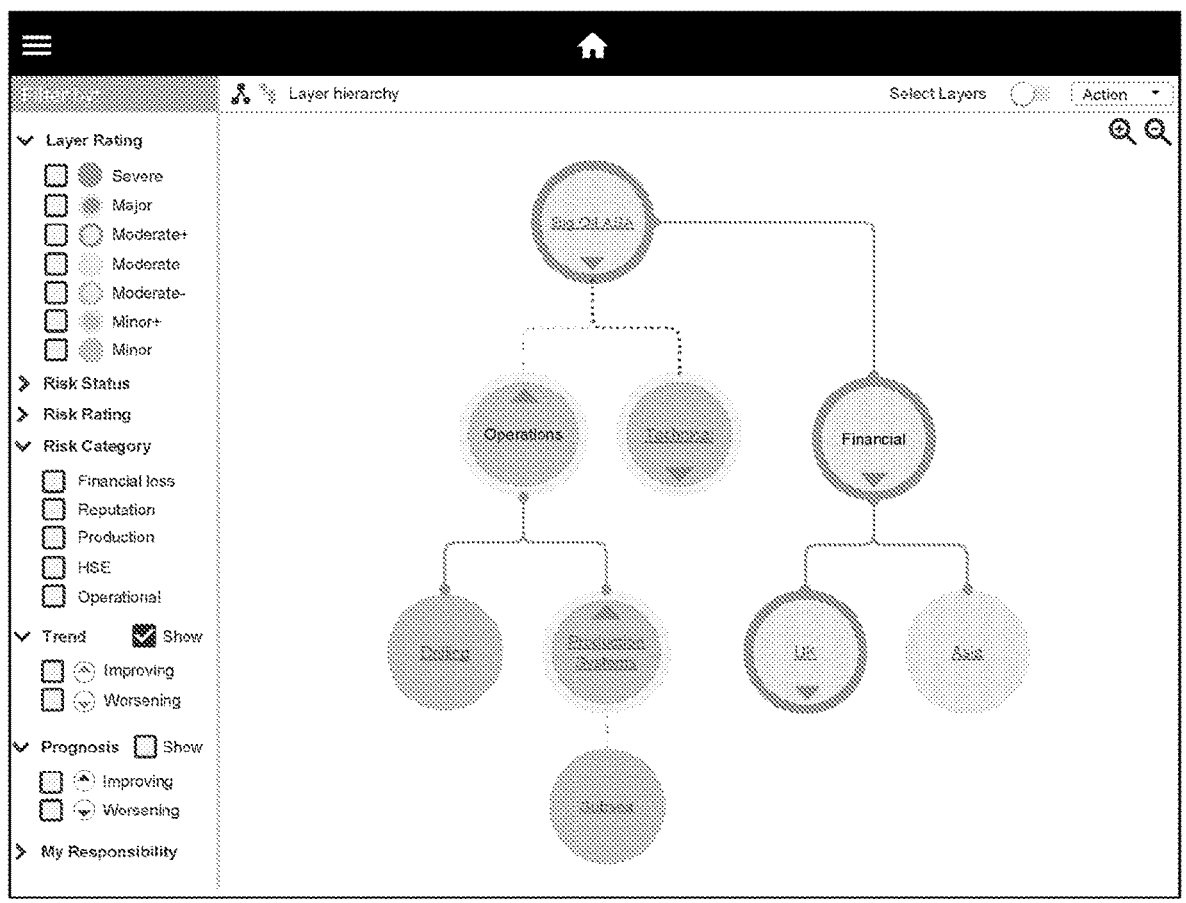
FIG. 9 shows a screenshot illustrating an exemplary protection layer hierarchy displayed to a user with access rights to the 'Big Oil ASA' protection layer.

A user with access rights to the 'Big Oil ASA' protection layer will be able to see the whole hierarchy shown in FIG. 9. Example of a user with access to this protection layer is for instance the CEO of Big Oil ASA.

The user can set one or more filters for the protection layer hierarchy to only view the protection layers with certain properties.

Figure 10:
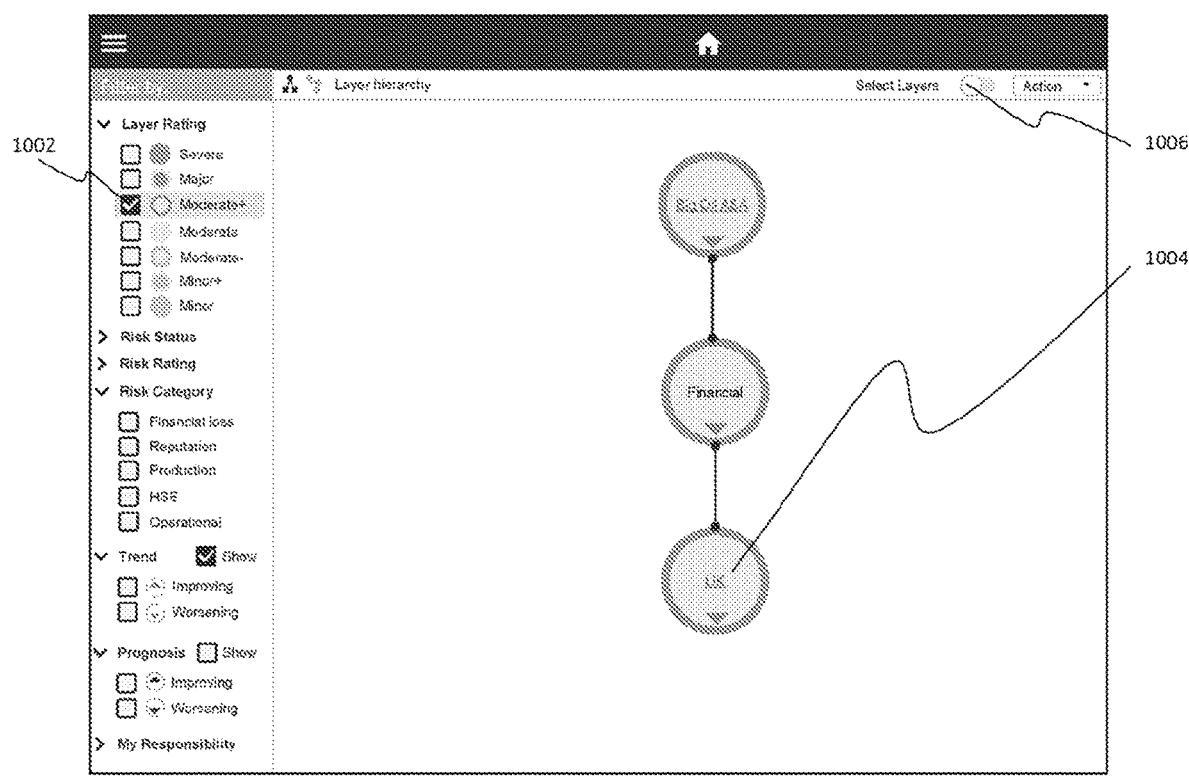
FIG. 10 shows a screenshot illustrating an exemplary filtered protection layer displayed to a user of the system.

FIG. 10 shows an example where the CEO has set a filter on the Layer Rating to only view the protection layers with rating equal to 'Moderate+' 1002 (yellow circle with red borderline). In this example only three protection layers have the rating 'Moderate+' and are presented to the CEO. The CEO can select more protection layer ratings categories, use other filters or enable Select Layers 1006 to narrow down the displayed protection layers to the ones he/she wants to take a closer look at.

Figure 11:
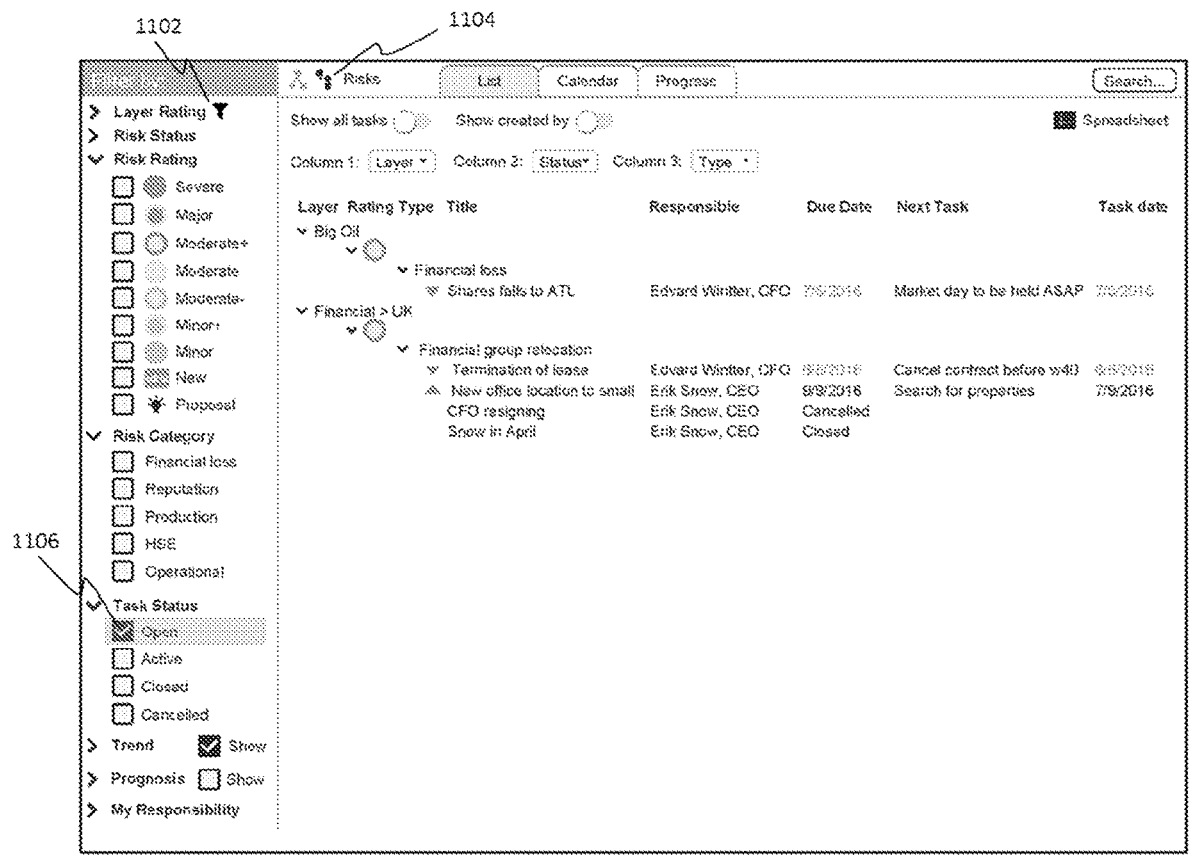
FIG. 11 shows a screenshot illustrating an exemplary filtered risk list displayed to a user of the system.

In FIG. 11 the CEO has changed the view to the risk list view 1104. The filter selected in FIG. 10 is still valid and active as indicated by the symbol 1102 that shows that Layer Rating is filtered. The Layer Rating filter is collapsed by the user, but when expanded it will be shown as in FIG. 10. The CEO has also set a filter on Task Status 1106 to only list risks with open tasks.

Figure 12:
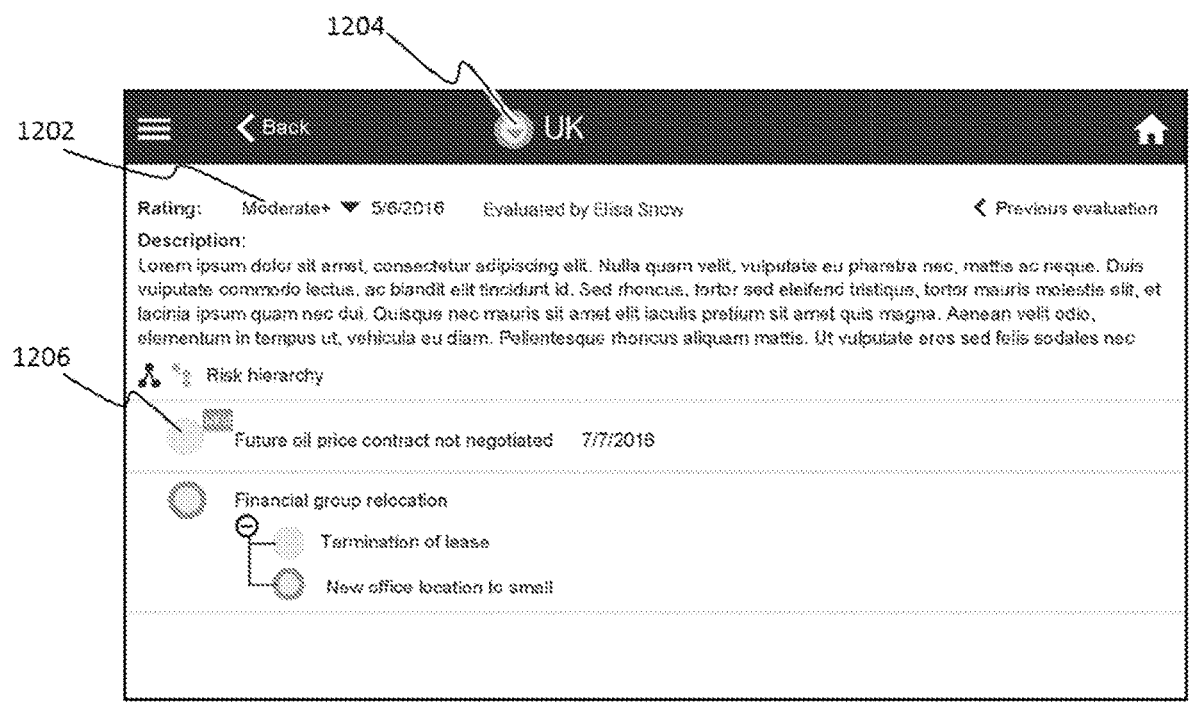
FIG. 12 shows a screenshot illustrating an exemplary protection layer with rating evaluation and its associated risks.

FIG. 12 illustrates an exemplary protection layer named 'UK' with protection layer evaluations and its associated risks. This protection layer could have been opened by the user for instance by clicking on the hyperlinked two colored risk rating symbol 1004 in FIG. 10.

The exemplary protection layer in FIG. 12 shows that the last, i.e. most recent, protection layer evaluation had a rating 1202 set to 'Moderate+'—also indicated by an yellow circle with red borderline 1204—and that one new risk 1206 with rating set to 'Moderate' as indicated by an yellow circle with yellow borderline has been added after the last evaluation. The risk added after the last evaluation has not been accounted for when evaluating the protection layer and is therefore visualized as a new risk, in this exemplary implementation the yellow circle with yellow border line is labelled with the text 'new'; i.e. it is visualized as a risk that has not yet been evaluated.

Figure 13:
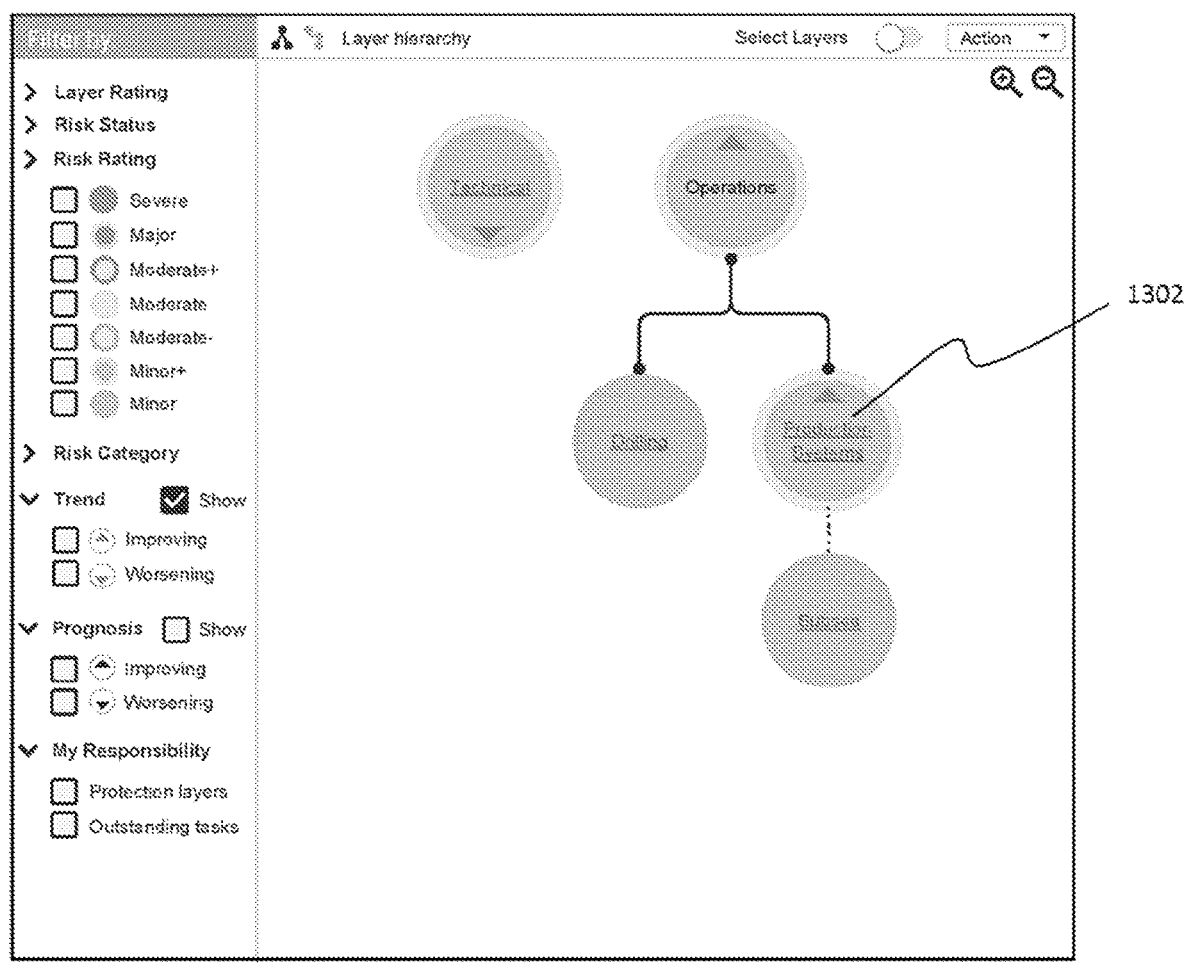
FIG. 13 shows a screenshot illustrating an exemplary protection layer hierarchy displayed to a user within the technical department.

Different users have different access to the protection layers. This is illustrated in FIG. 13 where John Doe from the technical department in Big Oil ASA is viewing the protection layer hierarchy.

In the example, John Doe has access to the protection layer 'Technical' where he is responsible for protection layer evaluations. He has also been given read access to the protection layer 'Operations' as the technical department often cooperate with operations. As John has access to the protection layer Operations he has also read access to its sublevels; such as 'Drilling', 'Production Systems' and 'Subsea'.

Figure 14:
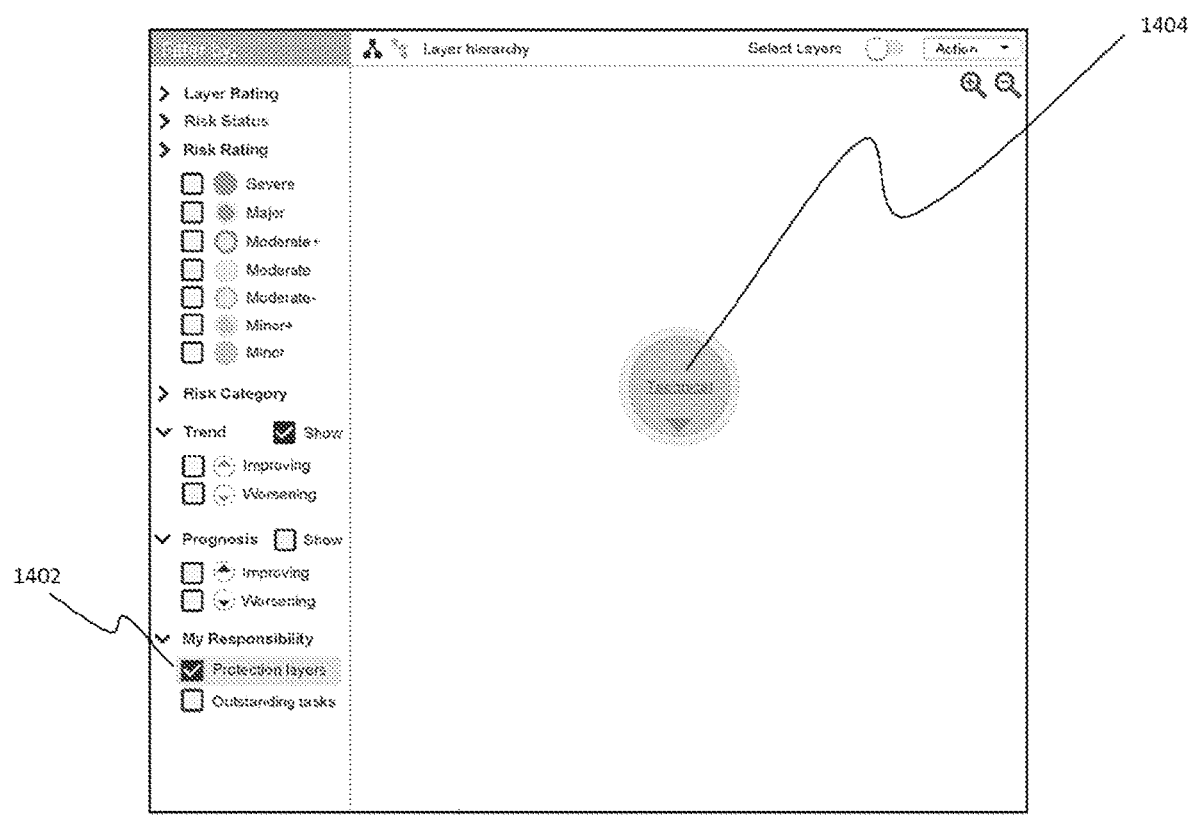
FIG. 14 shows a screenshot illustrating an exemplary use of the 'My Responsibility' protection layer hierarchy filter function.

In FIG. 14 John Doe has set a filter on 'My Responsibility' 1402 to only list the protection layers that he is responsible for and only the protection layer 'Technical' 1404 is listed in the hierarchy.

Figure 15:
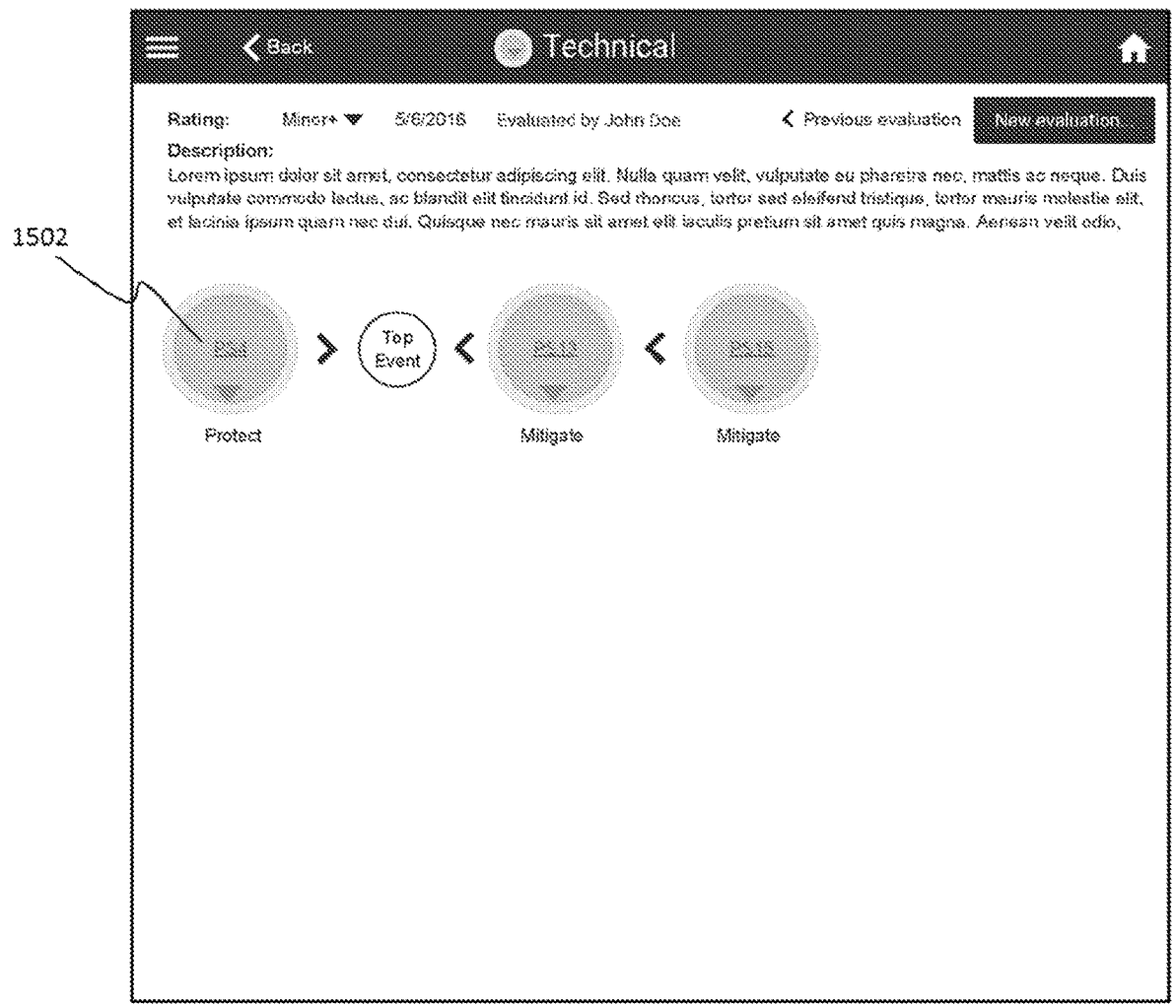
FIG. 15 shows a screenshot illustrating an exemplary protection layer with sub layers.

FIG. 15 illustrates the exemplary protection layer named 'Technical' with protection layer evaluations and its associated sub layers and Top Event. This protection layer could have been opened by John Doe for instance by clicking on the hyper linked protection layer two colored risk rating symbol 1404 in FIG. 14.

As shown in FIG. 15 a protection layer can have several sub layers and Top Events that are displayed when viewing the protection layer. If no sub layers and Top Events are defined the layout would have been like the layout shown in FIG. 12; i.e. with evaluation and risks, but without sub levels and Top Events.

Top Events are known from Bowtie diagrams used to visualize risks and represent the consequences of the risks. There can be more than one consequence for every Top Event. Barriers, i.e. layers, in the Bowtie typically appear on both sides of Top Events.

Sub layers are layers connected directly to the superior protection layer and will be displayed when viewing the superior layer like in FIG. 15, but typically not when viewing the layer hierarchy—except for instance when a dynamic setting like the filter 'My Responsibility' is active as in FIG. 14.

The sub levels in FIG. 15 are clickable as illustrated by the hyperlinks inside the protection layer two colored risk rating symbols for the sub layers.

Figure 16:
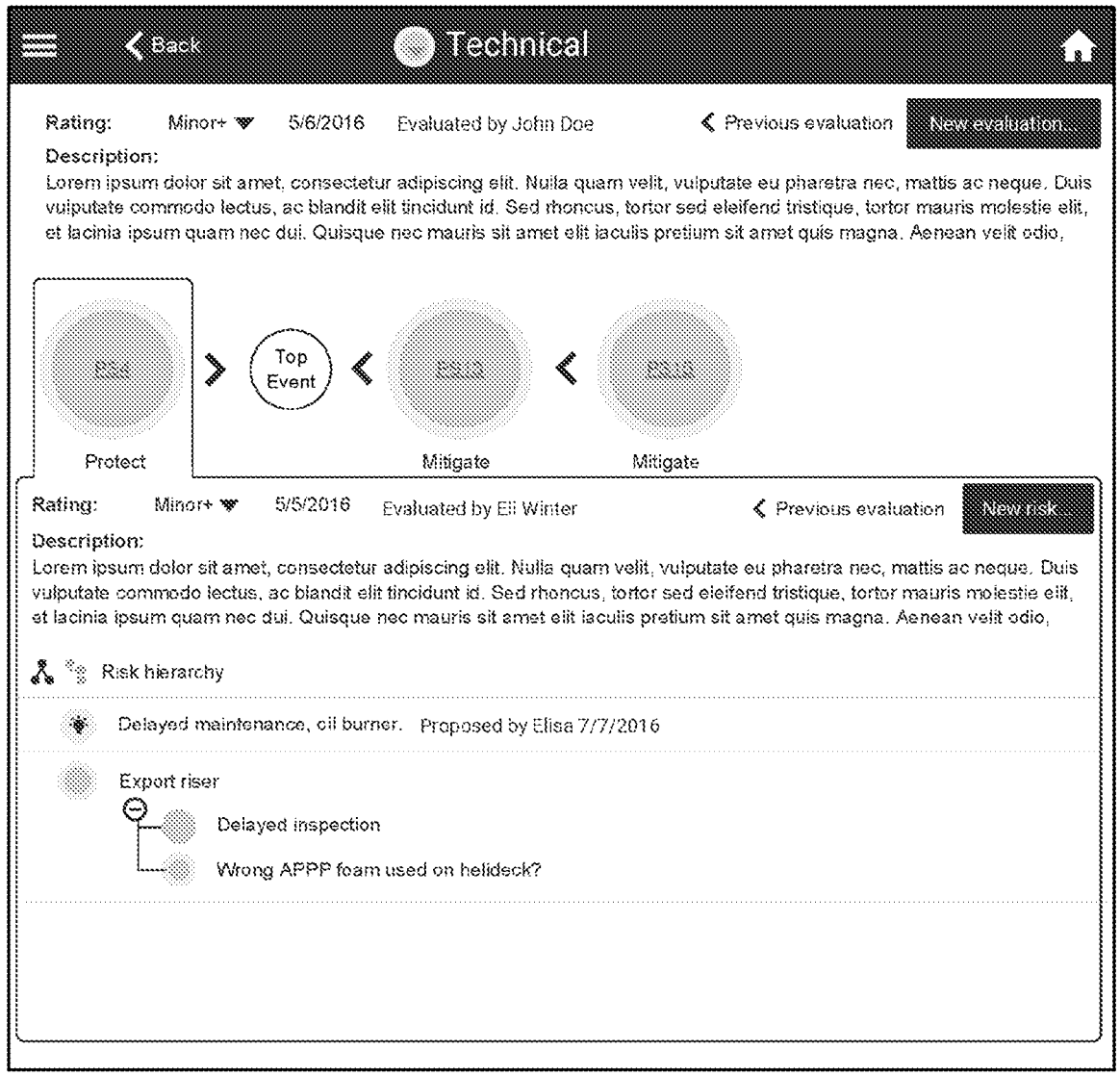
FIG. 16 shows a screenshot illustrating an exemplary sub layer configured for rating evaluations and its associated risks.

FIG. 16 illustrates an exemplary sub layer with its rating evaluations and associated risks displayed when the user, i.e. John Doe, clicks on the hyperlinked protection layer two colored risk rating symbol 1502 in FIG. 15 for the sub layer named PS4 (underlined text).

Figure 17:
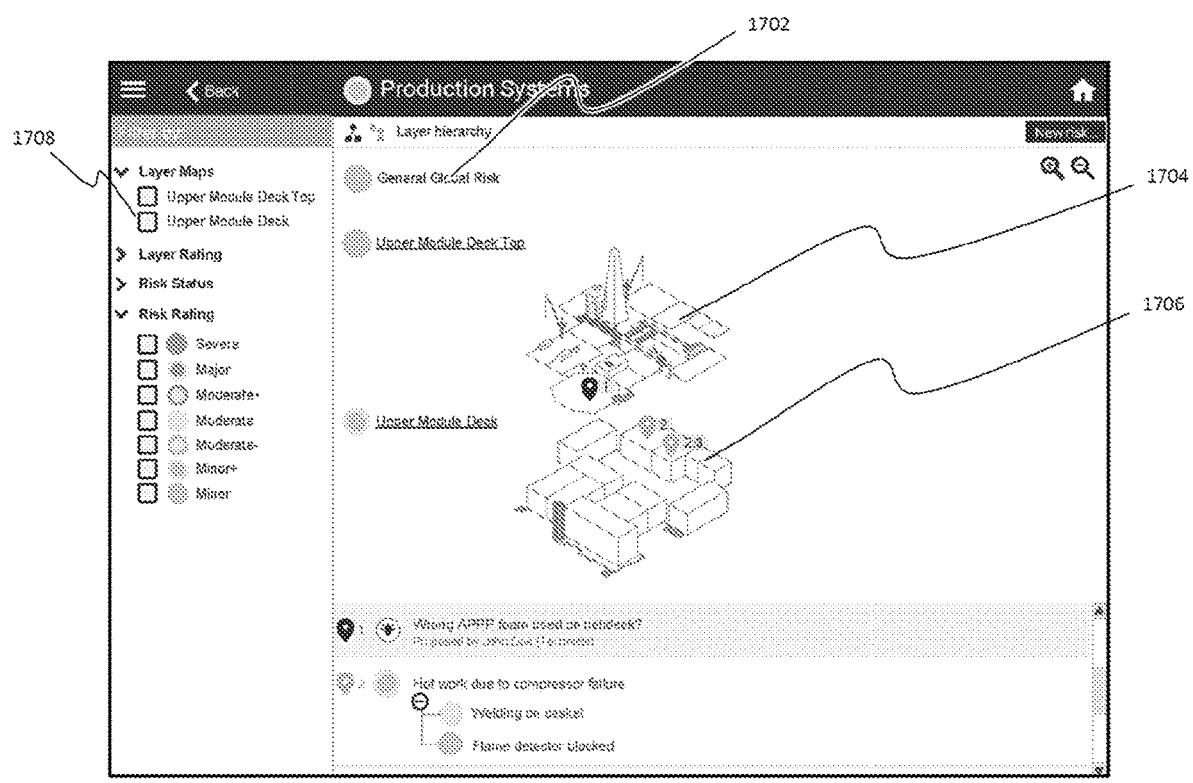
FIG. 17 shows a screenshot illustrating a protection layer with sub layers and layer maps.

FIG. 17 illustrates an exemplary protection layer with sub layers and layer maps. This protection layer shown in FIG. 17 could, for instance, have been opened by the user by clicking on the hyperlinked protection layer two colored risk rating symbol 1302 in FIG. 13.

Layer maps can be used to present risks that are location specific and/or if it is important to have an overview over risks in different areas/locations, and can be used both for layers and sub layers.

A risk can be connected to one or several layer maps.

FIG. 17 illustrates that the protection layer 'Upper Module Deck Top' is connected to a layer map 1704 with one risk (1) in a sub area. In this example the layer map shows a drilling platform where the risk is physically placed on the helideck area.

The figure also shows that the protection layer 'Upper Module Deck' is connected to a layer map 1706 with one risk placed in two sub areas and one risk placed in one area, in total two risks.

FIG. 17 also shows that for layers with long description 1702 the protection layer name text will typically be displayed outside the protection layer two colored risk rating symbol when viewing the protection layer hierarchy.

When a protection layer with layer map or sub layers with layer maps is being presented the layer maps is typically included in the filter as shown by 1708 to make it easy for the user to filter out the layer maps that he/she wants to take a closer look at.

Figure 18:
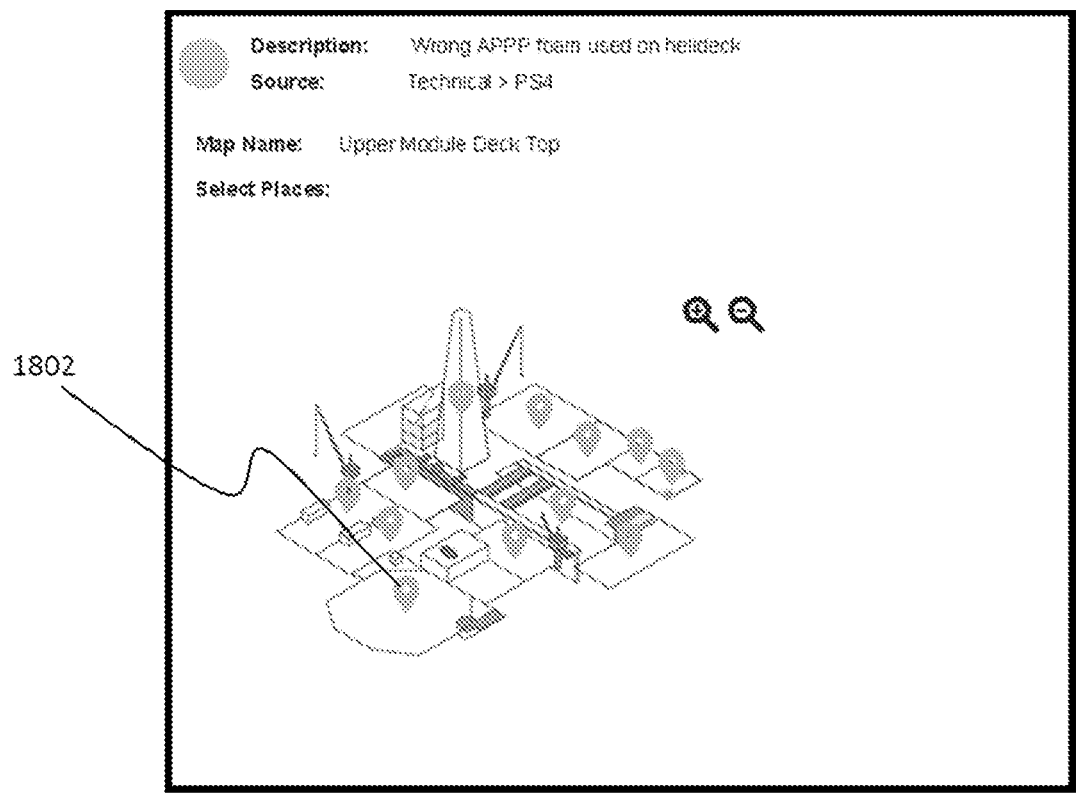
FIG. 18 shows a screenshot illustrating a layer map displaying the areas, i.e. places, a risk can be connected to, and FIG. 19 shows a screenshot illustrating a layer map where a risk is being connected to an area, i.e. a place.

When a risk is being connected to a layer map the user needs to select the areas where the risk is valid, e.g. as shown in FIG. 18 where the user needs to click on an icon such as 1802 to select the areas (i.e. a places) where the risk shall be valid.

Figure 19:
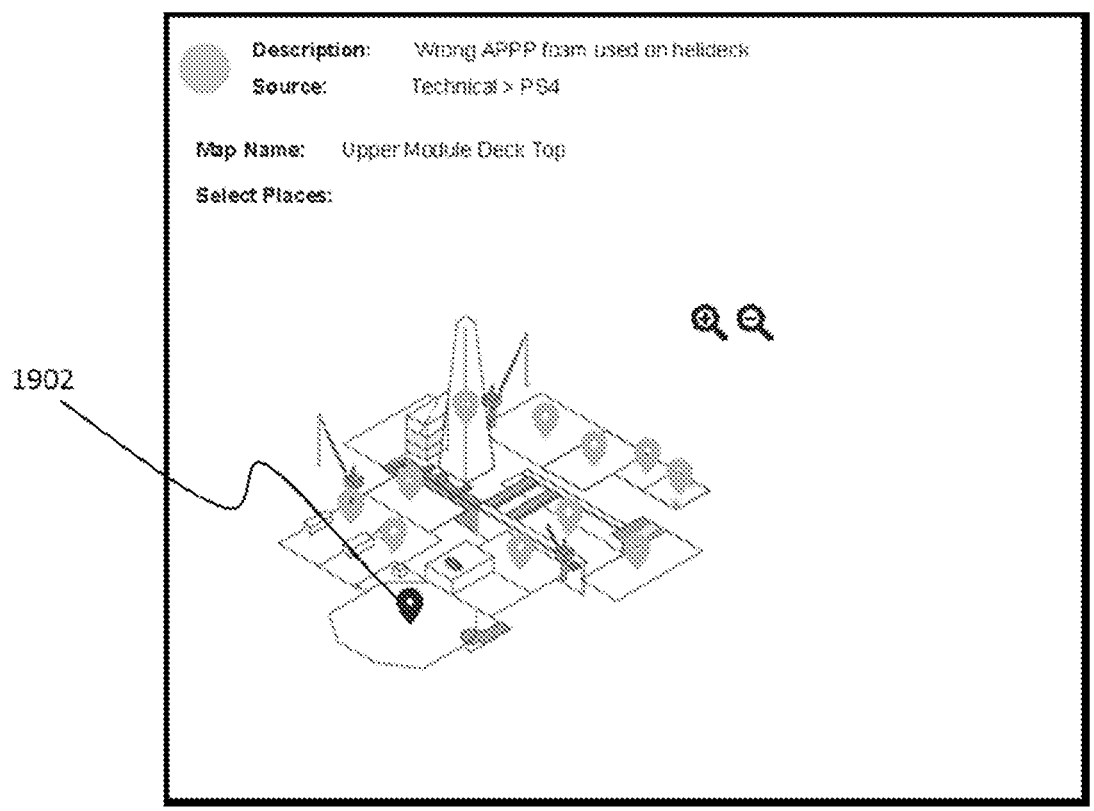

FIG. 19 illustrates a layer map where an area/place is selected 1902, for instance after being selected by the user by clicking on 1802 in FIG. 18. FIG. 19 illustrates that the icons representing the areas/places selected change color to indicate that the areas/places has been selected by the user.

The standardized two color risk symbol can further be displayed with additional contrast border line between fill color and borderline color and/or at outer circumference of the standardized two colored risk symbol for enhanced visibility.

The standardized two colored risk rating symbols used to represent risks and protection layers in the system can have the opposite use of fill colors and borderline colors, i.e. the rules for assigning the fill colors can be used for assigning the borderline colors and the rules for assigning the borderline colors can be used for assigning the fill colors.

The two colored risk rating symbols used to represent risks and protection layers can have different shapes, e.g. circles to represent risks and squares to represent protection layers or any other combination of shapes.

The invention claimed is:

1. A method for presentation of risks comprising:
using standardized multi-colored risk rating symbols in a graphical user interface of a client, the graphical user interface comprising multiple cells aligned with each other in a two-dimensional risk matrix, each cell representing a level of risk, wherein a first color is associated with a first risk level and a different second color is associated with a different second risk level, and the first color of the standardized multi-colored risk rating symbols of a two-dimensional risk matrix cell selected during risk assessment is used as main fill colors of the two-dimensional risk matrix cells of the standardized multi-colored risk rating symbols;
detecting a risk level;
detecting if the selected risk matrix cell is within a predetermined closeness to another risk level;
displaying the standardized multi-colored risk rating symbol of a risk with the first color as the main fill color and a borderline color that is the second color if the detected risk level is within the predetermined closeness to the second risk level; and
displaying the standardized multi-colored risk rating symbol of a risk with the first color as the main fill color and (a) the first color as the borderline color or (b) without a borderline if the detected risk level is within a predetermined closeness to the first risk level and not within the predetermined closeness to the second risk level.

2. The method according to claim 1, further comprising a step of defining main fill colors during configuration.

3. The method according to claim 1, wherein the steps of displaying include displaying the standardized multi-color risk symbol with an additional contrast border line between the main fill color and the borderline color or at an outer circumference of the standardized multi-colored risk symbol.

4. The method according to claim 1, further comprising a step of automatically assigning one of the standardized multi-colored risk rating symbols to a two-dimensional risk matrix cell in a two-dimensional risk matrix.

5. The method according to claim 1, further comprising a step of organizing risks into one or more protection layer hierarchies.

6. The method according to claim 5, further comprising a step of visualizing the protection layer hierarchies as structural line relationships diagrams.

7. The method according to claim 5, further comprising the step of filtering protection layer hierarchies dynamically according to a chosen filter.

8. The method according to claim 5, further comprising a step of linking layer maps to protection layers and filtering the layer maps dynamically according to a chosen filter.

9. The method according to claim 1, comprising dynamically setting the protection layer by configured inheriting rules if evaluation of the protection layer is not enabled.

10. A system for presentation of risks comprising:
at least one client;
a network providing communication links between various clients, the clients including a communication device adapted for the network, a graphical user interface, and a processor for processing information, the processor including a software to use standardized multi-colored risk rating symbols in the graphical user interface of the client, the graphical user interface comprising multiple cells aligned with each other in a two-dimensional risk matrix, each cell representing a level of risk;
wherein, a first color is associated with a first risk level and a different second color is associated with a different second risk level, and the first color of the standardized multi-colored risk rating symbols of a two-dimensional risk matrix cell selected during risk assessment is used as main fill colors of the two-dimensional risk matrix cells of the standardized multi-colored risk rating symbols, and
wherein, the processor is further provided with a software to:
(i) detect if a risk is within a predetermined closeness to another risk level,
(ii) display the standardized multi-colored risk rating symbol of a risk with the first color as the main fill color and a borderline color in a color that is the second color if the detected risk level is within the predetermined closeness to the second risk level, and
(iii) display the standardized multi-colored risk rating symbol of a risk with the first color as the main fill color and (a) the first color as the borderline color or (b) without a borderline if the detected risk level is within a predetermined closeness to the first risk level and not within the predetermined closeness to the second risk level.

11. The system according to claim 10, wherein the processor is further provided with a software to detect if a risk or protection layer is within a predetermined closeness to another risk level and display the standardized multi-colored risk rating symbol of a risk or protection layer with the first color as the main fill color and a borderline color in a color that is different from the main color.

12. The system according to claim 10, wherein the processor is further provided with a software to display the standardized multi-color risk symbol with an additional contrast border line between the main fill color and the borderline color or at an outer circumference of the standardized multi-colored risk symbol.

13. The system according to claim 10, wherein the processor is further provided with a software to automatically assign one of the standardized multi-colored risk rating symbols to a two-dimensional risk matrix cell in a two-dimensional risk matrix.

14. The system according to claim 10, wherein the processor is further provided with a software to organize risks into one or more protection layer hierarchies.

15. The system according to claim 14, wherein the processor is further provided with a software to visualize the protection layer hierarchies as structural line relationships diagrams.

16. The system according to claim 14, wherein the processor is further provided with a software to filter protection layer hierarchies dynamically according to a chosen filter.

17. The system according to claim 14, wherein the processor is further provided with a software to set the protection layer dynamically by configured inheriting rules, if evaluation of protection layer is not enabled.

18. The system according to claim 14, wherein the processor is further provided with a software to link layer maps to protection layers and filter the layer maps dynamically according to a chosen filter.

* * * * *